April 28, 1942.  P. F. PIE, JR  2,280,928

CHLORINATION OF METHANE

Filed March 4, 1939  2 Sheets-Sheet 1

Paul F. Pie Jr. INVENTOR.

BY
ATTORNEY

Patented Apr. 28, 1942

2,280,928

UNITED STATES PATENT OFFICE 2,280,928

CHLORINATION OF METHANE

Paul F. Pie, Jr., Newark, Del., assignor to Darco Corporation, Wilmington, Del., a corporation of Delaware Application March 4, 1939, Serial No. 259,768

22 Claims. (Cl. 260—662)

This invention relates to an improved process and apparatus for effecting the chlorination of methane to chlorinated hydrocarbons such as carbon tetrachloride, methylene chloride, chloroform, hexachlorobenzene, etc. More particularly the invention relates to such a process and apparatus wherein the principal chlorinated hydrocarbon formed is carbon tetrachloride.

It has heretofore been attempted to chlorinate methane by various methods to produce chlorinated hydrocarbons such as carbon tetrachloride, chloroform, methylene chloride, methyl chloride, etc., but so far as I am aware, none of the prior processes has been successfully operated on a commercial scale. The reaction was difficult to keep under control and frequently assumed explosive violence or proceeded in a manner known as "flaming" whereby the methane was converted to finely divided carbon rather than the valuable chlorinated hydrocarbons desired. In some cases, although the methods proposed were capable of successful control when carried out on a laboratory scale, nevertheless when transferred to large scale operations, they became completely uncontrollable.

The principal object of this invention is to provide a process and apparatus for the chlorination of methane wherein the reaction is kept under complete control at rates which are commercially practical.

Another object of this invention is to devise a process and apparatus for the chlorination of methane, wherein removal of the exothermic heat of reaction is made possible to such a degree that the chlorination proceeds without untoward tendencies, and is kept completely under control at all times.

Still another object is to accomplish the foregoing objects by a process and apparatus wherein the gases, upon entering the reaction chamber, contact a catalyst of relatively low catalytic activity and react at a relatively low temperature and whereby as the gases pass through the reaction chamber, become progressively more reacted, and consequently more diluted with reaction products, they contact a catalyst of progressively increasing catalytic activity and react at a progressively increasing temperature.

Other objects of the invention will more fully hereinafter appear.

In the chlorination of methane, in accordance with the preferred embodiment of the invention, the principal reaction is that forming carbon tetrachloride and hydrogen chloride, as follows:

$$4Cl_2 + CH_4 = CCl_4 + 4HCl$$

In this process, carbon tetrachloride constitutes 75–80% of the chlorinated hydrocarbon product. Other constituents of the chlorinated hydrocarbon product are methylene chloride, chloroform, tetrachlorethane, hexachlorobenzene, and smaller amounts of chlorinated hydrocarbons whose molecules contain from 2 to 6 carbon atoms. If desired, however, the process of this invention may be carried out with such adjustment of operating conditions and of proportions of reacting gases that the principal reaction product is methyl chloride, methylene chloride or chloroform. As will be seen, hydrogen chloride is always formed concurrently with chlorinated hydrocarbons. Since the recovery and separation of the reaction products, namely, hydrogen chloride and the various chlorinated hydrocarbons, are accomplished by methods which are well-known to those skilled in the art and which constitute no part of the present invention, such recovery and separation are not described here.

In order to more fully illustrate the preferred mode of carrying the invention into practice, reference may be had to the accompanying drawings wherein.

Figure 1:
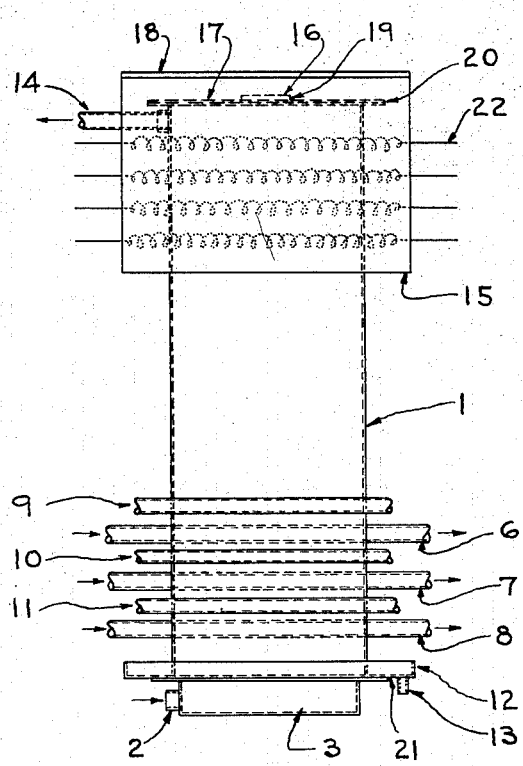
Fig. 1 is a front view showing diagrammatically a reaction chamber which has been found suitable for carrying out the process of this invention.
Figure 2:
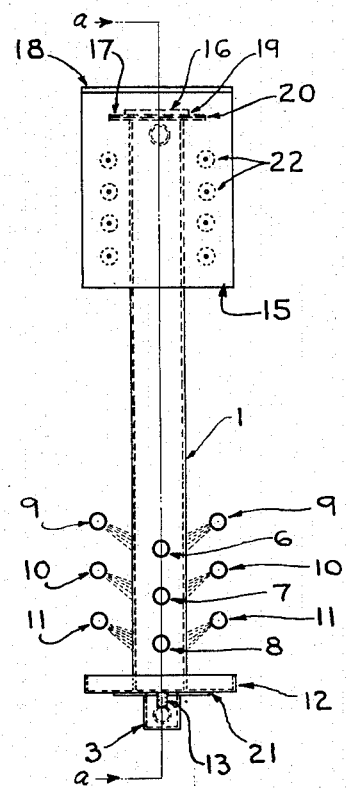
Fig. 2 is a side view of the apparatus shown in Fig. 1.

Now with reference to the drawings, I indicates generally the shell of the catalyst chamber which is gas-tight and is constructed from suitable material resistant to the action of chlorine, chlorinated hydrocarbons and hydrogen chloride at the temperatures encountered. As the preferred material for the construction of this chamber, I have employed a corrosion-resistant alloy known in the trade as "Hastelloy B," which is a nickel-molybdenum-iron alloy containing 58–68% nickel, 2–7% iron, and 24–33% molybdenum, developed by the Haynes-Stellite Company. In order to assure gas-tightness, the sheets of this alloy forming this chamber are welded at all joints except at disassembly and filling joints 19, 20 and 21 which are sealed with gaskets of hydrochloric acid-washed asbestos.

The unreacted gases which have been previously mixed in the correct proportions (in the preferred embodiment in the proportions of 4 parts of chlorine to 1 part of methane, by weight) enter through pipe 2 into sub-chamber or manifold 3. Thence, they pass upwardly through a removable porous diffusion plate 4 which supports the catalyst bed, designated generally as 5, and acts as a diffuser to distribute the incoming gases evenly over the cross-section of the reaction chamber. This diffusion plate 4 is made of any suitable resistant material, preferably porous carbon, although other materials such as porous graphite, refractory or ceramic materials, may be employed.

The gases next pass through the catalyst bed, designated generally as 5, which is of progressively increasing catalytic activity, and the temperature of which is carefully controlled, as fully described below, so as to maintain the reaction under complete control. Cooling tubes 6, 7 and 8 pass through the lower end of the reaction chamber. As shown, these cooling tubes go horizontally through the catalyst bed. It will be obvious, however, that any other arrangement of cooling coils which will carry off the necessary amount of heat may be employed. Through these cooling tubes a cooling fluid, such as air, water, brine, etc., is passed.

Surrounding the lower part of the reaction chamber is a series of perforated pipes 9, 10 and 11 spraying cold water onto the lower portion of the outside of the reaction chamber, so that it strikes the reaction chamber at about the level of inside cooling pipes 6, 7 and 8, respectively. The water running down the sides of the reaction chamber collects in trough 12 from which it is removed by suitable means, such as drain pipe 13.

The reacting gases, after passing through the reaction chamber, pass outwardly through pipe 14 to suitable recovery means wherein the valuable constituents contained therein are separated and purified by methods which constitute no part of the present invention.

Disposed about that portion of the upper half of the reaction chamber 1 which contains undiluted activated carbon as the catalyst as more fully described below, is a heating jacket 15 which preferably comprises electrical resistance 22 so designed as to maintain this portion of the catalyst chamber at 400–450° C. This heating jacket is preferably so constructed that ready access is had to the handhole 16 in the top of the catalyst chamber and to removable plate 17, by removal of the upper portion 18, thus enabling the ready insertion and removal of the catalyst bed.

The catalyst bed 5 is made up of a relatively inert and highly heat conductive granular material, such as graphite, and a highly active and less heat conductive catalytic material, such as granular activated carbon in varying amounts, the proportion of the latter progressively increasing in the direction in which the reacting gases travel. In place of graphite, other suitable materials may be used, provided they are sufficiently resistant to the reacting gases and are sufficiently heat conductive. An example of such an alternative material would be granular metals which are resistant to the gases encountered, such as pellets of Hastelloy B, gold-plated pellets, or granules of metal, etc. As the more highly active and less heat conductive material, activated carbon such as "Darco" is preferred. However, any highly active catalyst for the chlorine-methane reaction, such as coke, charcoal, steam treated coal, and other porous carbonaceous materials may be employed.

Figure 3:
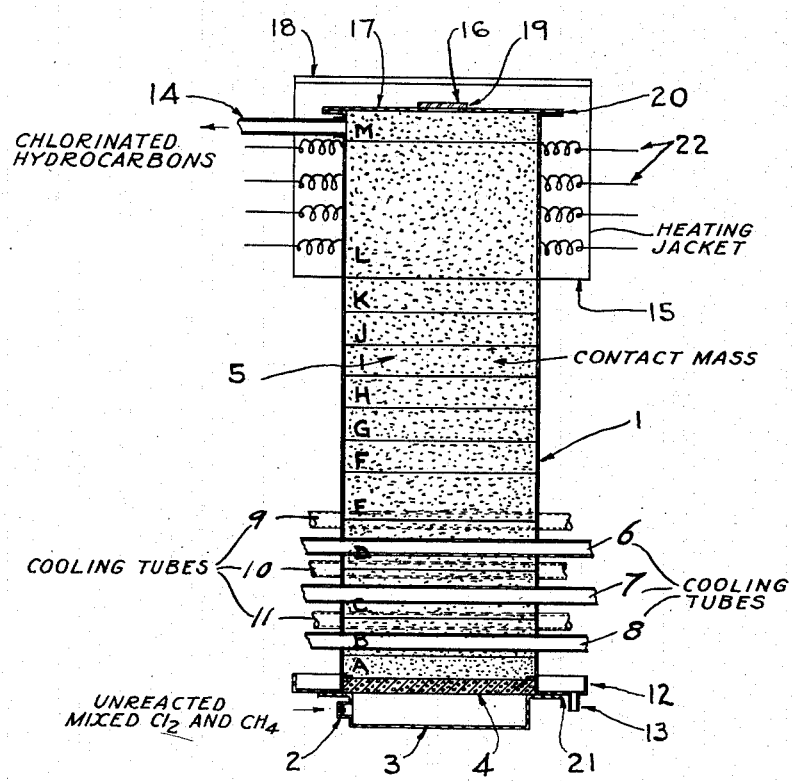
Fig. 3 is a diagrammatical cross-sectional view of the catalyst chamber of the apparatus portrayed in Figs. 1 and 2 and taken on line a—a of Fig. 2.

A description of a catalyst bed which has proved highly successful will now be given, with particular reference to Fig. 3 of the drawings. It is to be understood that this description is illustrative only, that the number and thickness of layers, percentages, screen sizes, etc., may be varied and that other equivalent materials may be substituted by those skilled in the art without departing from the inventive thought.

Layer A, which is located beneath the catalyst bed proper, is an inert layer of 16–30 mesh hydrochloric acid washed white sand, and serves as a diffuser and to stop the reaction from flaming back to or beyond carbon plate 4. Layer B is a layer of 16–30 mesh granular Acheson graphite and serves as a highly heat conductive material to aid in conveying away the initial heat of reaction, and as the initial catalyst for the incoming, entirely unreacted gases. Beginning with layer C, the layers consist of graphite diluted with increasing percentages of granular activated carbon, which in layers C to L is 16–30 mesh granular steam-activated charcoal. Layer M is made up of 100% of a coarser grade of the same type of activated carbon.

This catalyst bed had a cross-sectional area of 12 by 3 inches and the layers thereof had the following depth and composition:

| Layer | Depth | Size granules (Mesh) | Graphite | Activated carbon | |
|---|---|---|---|---|---|
| | | | Parts by weight | Parts by weight | Percent |
| | Inches | | | | |
| B | 2 | 16–30 | All graphite | 0 | 0 |
| C | 3 | 16–30 | 20 | 1 | 4.76 |
| D | 3 | 16–30 | 15 | 1 | 6.25 |
| E | 3 | 16–30 | 10 | 1 | 9.09 |
| F | 2 | 16–30 | 8 | 1 | 11.11 |
| G | 2 | 16–30 | 6 | 1 | 14.28 |
| H | 2 | 16–30 | 4 | 1 | 20.0 |
| I | 2 | 16–30 | 2 | 1 | 33.33 |
| J | 2 | 16–30 | 1 | 1 | 50.0 |
| K | 2 | 16–30 | 1 | 2 | 66.66 |
| L | 7½ | 16–30 | 0 | All act. Carbon | 100 |
| M | 3 | 4–8 | 0 | | 100 |

The temperature of that portion of the catalyst chamber which lies below about the upper part of upper cooling pipe 6 is graduated from about 280° C. at a zone adjacent cooling pipe 6 to below room temperature, say 10° C. at the bottom of the chamber. This cooled section comprises the lower two inches of layer D and all of layers C and B.

In beginning operation, a mixture of chlorine and methane at or about room temperature enters at pipe 2 into sub-chamber 3, up through carbon diffusing plate 4, and thence through the catalyst bed 5, the substantially completely reacted mixture passing out of the chamber through pipe 14. The portion of the catalyst chamber (layers L and M) containing undiluted activated carbon, and surrounded by the heating jacket 15 is maintained at 400–450° C. by passing electricity through the heating coils 22, electrically heating jacket 15. The lowermost section of the catalyst chamber 1 (i. e. the section adjacent lower cooling pipe 8) is held at below room temperature by running cold water through pipes 6, 7 and 8, and by spraying cold water on the outside of the reaction chamber by means of pipes 9, 10 and 11. The temperature is graduated between 280° C. and 400° C. in the section between the upper cooling tubes 6 and 9 and the lower portion of heating jacket 15 by allowing the reaction to creep toward the cooled section while maintaining the flow of incoming gases at a relatively low figure. When the reaction front enters the lower, cooled portion of the catalyst chamber, the exothermic heat of reaction is removed so rapidly that the reaction front can proceed no further toward the manifold 3. The tendency of the reaction front to proceed downwardly toward the manifold is further checked by the decreasing catalytic activity of the lower layers of the bed. With the reaction front so controlled, the rate of inflow of unreacted gases is gradually increased until the maximum rate is attained. The maximum rate is the greatest rate at which the process can be operated without heating up to exceed 450° C. at any locality or without permitting the exothermic reaction front to creep beyond the cooling zone at the lower end of the chamber. This maximum rate depends upon the rate at which the exothermic heat of reaction is removed from the apparatus. It is to be understood that when the reaction front is at the lower end of the chamber, the cooling means at that zone must have the capacity to remove sufficient heat to prevent the reaction front from creeping further toward the manifold 3.

The intermediate portion of the catalyst chamber (layers E to K) has a lesser capacity to remove heat because it is not provided with cooling tubes and because the catalyst bed therein has a smaller proportion of high heat conducting material. However, with the maximum flow of gases, the cooling capacity of this intermediate portion of the chamber is sufficient to prevent the temperature therein from rising above 450° C.

As stated above, a major difficulty previously encountered in the chlorination of methane was the instability of the reaction, i. e., its tendency either to quench or to become so highly exothermic as to "flame." The greatest instability occurs at the reaction front where the chlorine and methane are undiluted with reaction products. By bounding the reaction front on the one side with a bed of low catalytic activity and high heat dissipating capacity, and on the other side by a bed of higher catalytic activity and lower heat dissipating capacity, control of the reaction front is readily effected, for if the temperature at the reaction front tends to fall below that temperature necessary to sustain reaction, the reaction front merely recedes toward the intermediate portion of the chamber where the catalyst bed is of greater activity and where less heat is dissipated and the temperature is higher. On the other hand, if the temperature of the reaction front begins to rise, the increase in the generation of heat causes the reaction front to creep toward or into the lower portion of the chamber where the heat may be readily dissipated before the temperature rise becomes uncontrollable.

Another way of explaining the control of the process is that the unreacted gases first pass over a heat conducted material in a highly cooled zone, and thence into a reaction zone having a contact catalyst for the chlorine-methane reaction and a temperature of at least 280° C., at least a portion of the heat from the reaction zone passing downwardly through the heat conducting material and escaping by way of the cooled zone. If the reaction front tends to creep down toward the manifold 3, a greater proportion of heat is dissipated by way of the heat conducting material in the cooled zone. If the reaction front tends to recede, the path for escape of heat via the highly cooled zone tends to become longer, thereby lessening the dissipation of heat and preventing quenching of the reaction.

In actual operation, the reaction front finds a zone of equilibrium, the exact location of the reaction front being primarily dependent upon the rate of the flow of gases, the rate of cooling and upon the composition of the particular catalyst bed employed. Preferably, the process is conducted so that the reaction front is in equilibrium at a zone lying adjacent the upper end of the lower, cooled portion of the chamber. It is to be understood, however, that the reaction front may be maintained well within the lower, cooled portion of the chamber if so desired.

The process is then continued indefinitely, control over the same being rendered very simple and positive as the process continues, it is only necessary to so regulate the flow of incoming unreacted gases and the degrees of cooling the entrance end of the reaction chamber and of heating the exit end of the reaction chamber that the reaction takes place at no locality at a temperature above 450° C. and so that the reaction front never goes back below the cooled portion of the reaction chamber. Thus, it will be seen that while the reaction begins at the top of the cooled portion and the reaction temperature becomes progressively higher as the reaction mass travels upward, yet the reaction is never out of control, and that conditions are so regulated that the progressively increasing catalyst activity and progressively higher temperature are such that at any given point the diluting effect of the reaction products on the unreacted gases is overcome sufficiently to cause further reaction without, however, allowing the temperature to rise so rapidly due to the exothermic reaction that the reaction becomes uncontrollable. It will be further seen that the length of the catalyst chamber and the several variables for controlling the reaction, such as the rate of increase of catalytic activity of the catalyst bed, flow of gases, temperature, etc., are so regulated that substantially all of the chlorine and methane have reacted by the time the reacting mass reaches the outlet end of the catalyst chamber.

While methane is above referred to as the gas to be chlorinated, it is to be understood that natural gas or other gas containing substantial amounts of methane may be used in place of pure methane.

In order to understand the control which is effected by the foregoing process, the kinetics of the chlorination reaction are set forth as follows. At room temperature and in the absence of actinic light, chlorine and methane are not sufficiently active to react. As the temperature increases, the activity of the two gases increases, until at 280° C. their activity is sufficient to enable them to react at a comparatively slow rate. The reaction, however, is strongly exothermic and, unless precautions are taken to remove the greater part of the heat liberated, the reaction will become uncontrollable since (1) the temperature rises as the heat liberated exceeds the heat removed; (2) the rate of reaction increases as the temperature rises; (3) the rate of heat generation increases as the rate of reaction increases; (4) the temperature rise is accelerated as the rate of heat generation is increased. In order to maintain one definite temperature at any locality, the heat removed from that locality must exactly equal the heat generated at that locality. If the heat removed is greater than the heat generated, the temperature will drop until at a temperature below 280° C. the reaction ceases. If the heat generated is greater than the heat removed, the temperature will rise until a heat balance is reached. The temperature at which this heat balance takes place depends on the relation between (1) The rate of increase of removal of heat with rising temperature, as compared to (2) The rate of increase of generation of heat with rising temperature.

Under (1) the removal of heat is accomplished to the greatest extent by conduction to the surfaces of the reaction chamber and disposed of by conduction as by cold air, cold cooling fluid, and by radiation. Some heat is also employed to heat the cooler incoming gases to the reaction temperature. Under (2), the rate of generation of heat at a certain point depends entirely upon the chlorine-methane reaction.

Conditions should be so adjusted that the temperature at which the heat balance referred to takes place is graduated from 280° C. at the point at which reaction begins (top of cooled zone) to 450° C. at the point at which the reaction is substantially complete, and that it is at no point above 450° C.

Another factor affecting the reaction rate between chlorine and methane is the relative concentrations of the reacting constituents and their products. As the concentrations of the products increase, the reaction is retarded by reason of the diluting effect of the reaction products. Because of this "dilution" effect of the reaction products, it becomes necessary to increase the temperature gradually as the reaction proceeds in order to react completely all of the chlorine and methane before the chamber exit is reached. This temperature gradation is accomplished principally by varying the catalytic activity of and the heat conductivity of the catalyst bed, as described above. The higher the graphite concentration, the lower the catalytic activity and the greater the heat conductivity of the catalyst, and consequently the lower the reaction temperature, at any given point. Conversely, the higher the activated carbon concentration, the greater the catalytic activity and the lower the heat conductivity of the catalyst, and therefore the higher the temperature at a given point. The final layers of activated charcoal alone have relatively poor heat conductivity, and at this point it is desirable not to conduct the heat away from the reacting gases but to supply heat thereto, since the diluting effect of the reaction products is at a maximum. At this point, it is requisite that the reacting mass be in contact with a catalyst of the greatest catalytic activity, which requisite is satisfied by using pure (undiluted) activated carbon.

From the foregoing, it will be seen that the success of the process is due to control of the reaction at the entering end of the chamber. This is a vital feature of the invention. This control is accomplished by the combined effect of:

(1) Greater heat dispersion at the entering end of the chamber to maintain a lower temperature which decreases the reaction rate between chlorine and methane.

(2) Dilution of the activated charcoal with graphite to decrease the catalytic activity.

It will be seen that I have devised an economical and facile method for the control of the highly exothermic reaction between chlorine and methane, and one which can be successfully applied equally well on either a small or a large scale.

It is to be understood by those skilled in the art that variations in the size and gradation of the particles making up the porous catalyst or contact mass may be made provided that the particles are of such size and gradation that no relatively slow-moving, non-conductive pockets of gas are present in the catalyst or contact mass, particularly the diluted sections of the contact mass where controlled heat conductivity is essential. Such non-conductive pockets of gas cause localized over-heating and subsequent flaming of the reaction mixture, which would cause the methane to be converted into carbon and hydrogen chloride. Each particle of the catalyst bed should have as many points of contact as possible with adjacent particles in order to distribute the heat throughout the mass. The critical pocket size depends upon the activity and temperature of the reacting mixture at that point, upon the gas velocity, and upon the pressure head employed to force the incoming gases through the catalyst bed.

While I have shown the exothermic heat as removed by cooling fluid, it is to be understood that the heat units so removed may be utilized as desired, for example, as a source of heat for the diluted gases at the exit of the reaction chamber. Many other modifications in the process and apparatus will be obvious to those skilled in the art and it is intended that the invention shall be limited only by the scope of the appended claims.

Having fully described my invention, what I claim is:

1. The process of chlorinating methane which comprises passing a mixture of chlorine and methane through a contact mass consisting essentially of a catalyst for the chlorine-methane reaction of relatively low heat conductivity and a diluent of relatively high heat conductivity, the gases, in their passage through the contact mass, contacting portions of the mass having progressively increasing catalytic activity.

2. The process of chlorinating methane which comprises passing a mixture of chlorine and methane through a contact mass comprising a catalyst for the chlorine-methane reaction, the temperature of the reaction being progressively increased from about 280° C. to at least 400° C. as the gases pass through the contact mass.

3. The process of chlorinating methane which comprises passing a mixture of chlorine and methane through a contact mass comprising a catalyst for the chlorine-methane reaction, the gases, in their passage through the contact mass, contacting portions of the mass of progressively increasing catalytic activity and the temperature of the reaction being progressively increased from about 280° C. to at least 400° C. as the gases pass through the contact mass.

4. The process of chlorinating methane which comprises passing a mixture of chlorine and methane through a contact mass consisting essentially of a catalyst for the chlorine-methane reaction of relatively low heat conductivity and a granular diluent, the proportion of catalyst in said contact mass progressively increasing as the gases pass through said contact mass.

5. The process of chlorinating methane which comprises passing a mixture of chlorine and methane through a contact mass comprising a catalyst for the chlorine-methane reaction and a diluent, the proportion of catalyst in said contact mass being progressively increased and the temperature of the reaction being progressively increased from about 280° C. to at least 400° C. as the gases pass through the contact mass.

6. The process of chlorinating methane which comprises passing a mixture of chlorine and methane through a contact mass consisting essentially of a catalyst for the chlorine-methane reaction of relatively high catalytic activity and of relatively low heat conductivity and a diluent of relatively high heat conductivity, the proportion of said catalyst in said contact mass progressively increasing as the gases pass through said contact mass.

7. The process of chlorinating methane which comprises passing a mixture of chlorine and methane through a contact mass consisting essentially of a catalyst for the chlorine-methane reaction of relatively low heat conductivity and a diluent of relatively high heat conductivity, both the proportion of said catalyst in said contact mass and the temperature of the reacting mixture progressively increasing as the gases pass through said contact mass.

8. The process of chlorinating methane which comprises passing a mixture of chlorine and methane through a contact mass consisting essentially of activated carbon and graphite, the proportion of activated carbon in said contact mass progressively increasing as the gases pass through said contact mass.

9. The process of chlorinating methane which comprises passing a mixture of chlorine and methane through a contact mass consisting essentially of activated carbon and graphite, both the proportion of activated carbon in said contact mass and the temperature of the reacting mixture progressively increasing as the gases pass through said contact mass.

10. The process of chlorinating methane which comprises passing a mixture of chlorine and methane through a contact mass, the portion of said contact mass which the entering gases first contact consisting of graphite, the portion of said contact mass which the gases last contact consisting of activated carbon, and the intermediate portion of said contact mass consisting of activated carbon and graphite, the proportion of activated carbon in said intermediate portion progressively increasing in the direction in which the gases travel.

11. The process of chlorinating methane which comprises admixing chlorine and methane, passing the admixed gases through a first contact mass of good heat conductivity, and thence directly from said first contact mass through a reaction zone having a contact catalyst for the chlorine-methane reaction and a temperature of at least about 280° C., and cooling the said first contact mass sufficiently to prevent the reaction from creeping backwardly into the unreacted entering gases.

12. A process as set forth in claim 11 and wherein the gases in their passage through the reaction zone contact portions of the contact catalyst of progressively increasing temperature and catalytic activity.

13. Apparatus for the chlorination of methane comprising a reaction chamber provided with an entrance for the mixture of chlorine and methane and an exit for the reaction products, said reaction chamber containing, between the entrance and the exit, a permeable contact mass comprising a catalyst for the chlorine-methane reaction, the contact mass being of progressively decreasing heat conductivity toward the exit of the reaction chamber.

14. Apparatus for the chlorination of methane comprising a reaction chamber provided with an entrance for the mixture of chlorine and methane and an exit for the reaction product, said reaction chamber containing, between the entrance and the exit, a contact mass consisting essentially of a catalyst for the chlorine-methane reaction of relatively high catalytic activity and of relatively low heat conductivity and a diluent of relatively high heat conductivity, the proportion of catalyst in said contact mass progressively increasing and the amount of the diluent progressively decreasing toward the exit of the reaction chamber.

15. Apparatus as set forth in claim 14 and wherein the catalyst is activated carbon and the diluent is graphite.

16. Apparatus for the chlorination of methane comprising a reaction chamber provided with an entrance for the mixture of chlorine and methane and an exit for the reaction products, said reaction chamber containing a contact mass having a first portion adjacent the said entrance and consisting of graphite, a third portion adjacent said exit and consisting of activated carbon, and a second portion between said first and third portions and consisting of activated carbon and graphite, the proportion of activated carbon in said second portion progressively increasing toward the said third portion.

17. Apparatus for the chlorination of methane comprising a reaction chamber provided with an entrance for the mixture of chlorine and methane and an exit for the reaction products, cooling means for said reaction chamber adjacent the said entrance, a first contact mass of good heat conductivity located within said reaction chamber adjacent the said entrance, said first contact mass being substantially non-catalytic for the chlorine-methane reaction, and a second contact mass located within said reaction chamber between said first contact mass and the exit, said second contact mass comprising a catalyst for the chlorine-methane reaction.

18. Apparatus as set forth in claim 17 and wherein the reaction chamber is provided with heating means adjacent the exit for the reaction products.

19. Apparatus for the chlorination of methane comprising a reaction chamber provided with an entrance for the mixture of chlorine and methane and an exit for the reaction products, said reaction chamber containing, between the entrance and the exit, a contact mass consisting essentially of a catalyst for the chlorine-methane reaction and a diluent, the contact mass being of progressively increasing catalytic activity and of progressively decreasing heat conductivity toward the exit of the reaction chamber.

20. Apparatus for the chlorination of methane comprising a reaction chamber provided with an entrance for the mixture of chlorine and methane and an exit for the reaction products, said reaction chamber containing a contact mass for the gases passing through the chamber, said contact mass being of progressively increasing catalytic activity toward the exit end of the chamber, said chamber having a first portion adjacent said entrance and provided with cooling means and a second portion adjacent said first portion but lying toward the exit with respect to said first portion, said second portion having a lesser capacity to dissipate the heat of reaction than said first portion.

21. Apparatus for the chlorination of methane comprising a reaction chamber provided with an entrance for the mixture of chlorine and methane and an exit for the reaction products, a first permeable contact mass of relatively high heat conductivity located within said chamber adjacent the said entrance, cooling means for said contact mass, and a second permeable contact mass comprising a catalyst for the chlorine-methane reaction, said second contact mass being of lower heat conductivity than said first contact mass and being located within said chamber and toward the said exit with respect to the first contact mass.

22. Apparatus as set forth in claim 21 and wherein the first contact mass consists of graphite and the second contact mass consists essentially of activated carbon and graphite.

PAUL F. PIE, Jr.